R. J. MULLIN.
Manufacture of Dies for Punching.

No. 142,407. Patented September 2, 1873.

Witnesses:
E. Wolff
Sedgwick

Inventor:
R. J. Mullin
Per
Attorneys.

UNITED STATES PATENT OFFICE.

ROBERT J. MULLIN, OF PROVIDENCE, RHODE ISLAND, ASSIGNOR TO HIMSELF AND MICHAEL R. HANLEY, OF SAME PLACE.

IMPROVEMENT IN THE MANUFACTURE OF DIES FOR PUNCHING.

Specification forming part of Letters Patent No. 142,407, dated September 2, 1873; application filed July 12, 1873.

*To all whom it may concern:*

Figure 1:
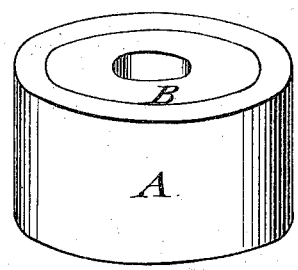
Figure 2:
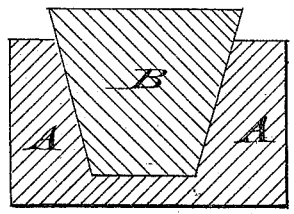
Figure 3:
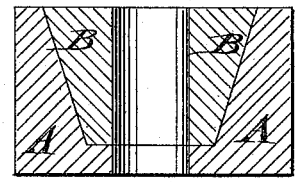

Be it known that I, ROBERT J. MULLIN, of Providence, in the county of Providence and State of Rhode Island, have invented an Improved Process of Manufacturing Dies, of which the following is a specification:

In the accompanying drawing, Figure 1 represents a perspective view of my improved die. Fig. 2 is a vertical central section of the same previous to the weld of the steel piece and drilling of the hole; and Fig. 3 is a vertical central section after the welding and drilling.

Similar letters of reference indicate corresponding parts.

The object of my invention is to improve the dies used for the cold punching of nuts, washers, jewelry, &c., so that they are more durable, require less steel, and offer a greater punching-surface. The dies which are at present used for cold punching are produced by welding a piece of steel on the face of the iron base, which requires skilled and careful workmen; but even then the face is liable to come off in hardening. The great difficulty lies in welding the steel and iron parts together so that the face does not break off in hardening, or when working with it. My invention is intended to overcome this difficulty; and consists in welding the steel into the iron base, flush at the top, and extending to within a short distance from the bottom, so that there is a greater depth of steel and greater strength, as the iron part surrounds the steel core.

In the drawing, A represents the iron base of the die; B, a piece of steel, preferably of conical shape, which is pressed into the hot iron die, and then welded with it. The hole is then drilled centrally through the steel core B, so that the steel surrounds the hole, and extends about double the depth of the old dies.

The welding of the core on the base can be done by any hand familiar with welding, as the iron, being all around the steel, prevents it, in a great measure, from burning. At the same time it is obvious that a great deal less steel is necessary for a face extending, in vertical direction, around the hole of the die, instead of that required for a horizontal face-piece. A die with the face B is made in less time, and lasts much longer, than the old style, so that it is, in every respect, preferable to the latter.

Having thus described my invention, I claim as new and desire to secure by Letters Patent—

The process of manufacturing dies for cold-punching, as herein set forth.

ROBERT J. MULLIN. [L. S.]

Witnesses:
PATRICK J. CARTY,
CHARLES H. PAGE.